United States Patent [19]

Owoc et al.

[11] Patent Number: 4,540,019
[45] Date of Patent: * Sep. 10, 1985

[54] BELLOWS SEALED STEM FOR ROTARY VALVE

[75] Inventors: James R. Owoc; Richard P. Tremblay, both of Pittsburgh, Pa.

[73] Assignee: Kerotest Manufacturing Corp., Pittsburgh, Pa.

[*] Notice: The portion of the term of this patent subsequent to Aug. 31, 1984 has been disclaimed.

[21] Appl. No.: 609,718

[22] Filed: May 14, 1984

Related U.S. Application Data

[63] Continuation of Ser. No. 357,050, Mar. 11, 1982, Pat. No. 4,462,422.

[51] Int. Cl.³ .............................................. F16K 41/10
[52] U.S. Cl. .................................. 137/557; 251/339.3; 73/40; 74/18.1
[58] Field of Search ............... 137/557; 251/335 R, 251/335 B; 73/40, 49.1, 49.2; 74/424.8 VA, 18, 18.1

[56] References Cited

U.S. PATENT DOCUMENTS

| | | | |
|---|---|---|---|
| 701,615 | 6/1902 | Reichenbach | 251/335 B |
| 1,301,948 | 4/1919 | Kaplan et al. | 251/335 B |
| 1,514,968 | 11/1924 | Hull | 251/335 B |
| 1,644,825 | 10/1927 | Fulton | 251/335 B |
| 2,105,864 | 1/1938 | Saunders | 251/335 B |
| 2,218,886 | 10/1940 | Krause | 251/335 B |
| 2,526,825 | 10/1950 | Nier et al. | 251/22 |
| 2,659,569 | 11/1953 | Ehlke | 251/335 B |
| 2,659,570 | 11/1953 | Werker et al. | 251/335 B |
| 2,854,041 | 9/1958 | Stinson | 137/625.11 |
| 2,907,548 | 10/1959 | Maas et al. | 251/85 |
| 3,019,812 | 2/1962 | Rumsey | 137/557 |
| 3,027,916 | 4/1962 | Smith | 251/335 B |
| 3,108,780 | 10/1963 | Wishart | 251/334 |
| 3,252,341 | 5/1966 | Reiter | 74/18.1 |
| 3,295,191 | 1/1967 | Gallagher et al. | 29/157.1 R |
| 3,364,754 | 1/1968 | Longer | 74/18.1 |
| 3,491,789 | 1/1970 | Callahan, Jr. et al. | 137/340 |
| 3,498,319 | 3/1970 | Schnabel | 137/375 |
| 3,524,620 | 8/1970 | Gallagher et al. | 251/63.4 |
| 3,567,176 | 3/1971 | Johnson | 251/174 |
| 3,782,685 | 1/1974 | Gallagher et al. | 251/335 B |
| 3,787,023 | 1/1974 | Shuffleburger et al. | 251/335 B |
| 3,811,651 | 5/1974 | Gallagher et al. | 251/335 B |
| 4,166,607 | 9/1979 | Webb | 251/335 B |
| 4,232,695 | 11/1980 | Roberge | 251/335 B |

FOREIGN PATENT DOCUMENTS

| | | |
|---|---|---|
| 350865 | 6/1979 | Austria . |
| 356470 | 4/1980 | Austria . |
| 2305653 | 10/1976 | France . |
| 785149 | 10/1957 | United Kingdom . |

OTHER PUBLICATIONS

Manually Operated Bellow Valves, Nupro Co., Willoughby, Ohio, 1973.

Primary Examiner—A. Michael Chambers
Attorney, Agent, or Firm—Stanley J. Price, Jr.

[57] ABSTRACT

A valve body includes a chamber for the flow of fluid between an inlet and outlet thereto. A valve member, such as a ball valve member, is positioned in the chamber for rotatable movement between an open position and a closed position to open and close the chamber. A bent valve stem extends between and is connected to the valve member and a rotatable valve actuator. Rotation of the actuator moves the valve member by rotation of the valve stem between the open and closed positions. The valve stem upper end portion is displaced from the valve stem lower end portion to provide the valve stem with a bent configuration. A bellows surrounds the valve stem to provide a hermetic seal around the stem between the valve body and the actuator. The bellows has a bent configuration corresponding to the bent configuration of the valve stem. The outer surface of the valve stem is positioned closely adjacent to the inner surface of the bellows to provide the bellows with support substantially along the entire length of the bellows and means are provided to minimize wear between the bellows and stem. In operation, the bellows is internally pressurized and the support provided by the valve stem prevents lateral deflection of the bellows and failure of the bellows due to distortion.

12 Claims, 12 Drawing Figures

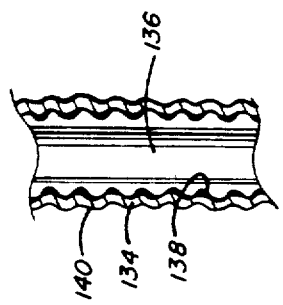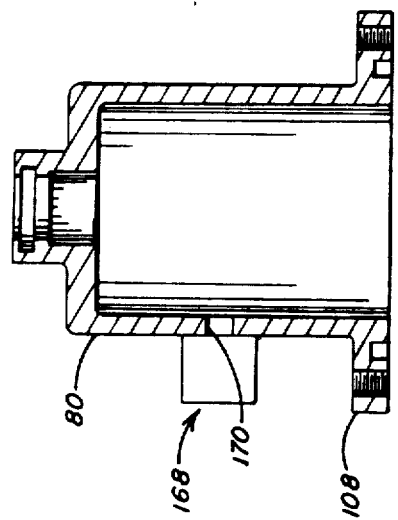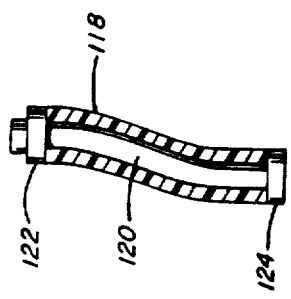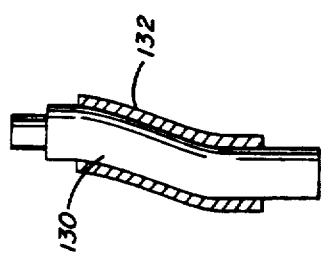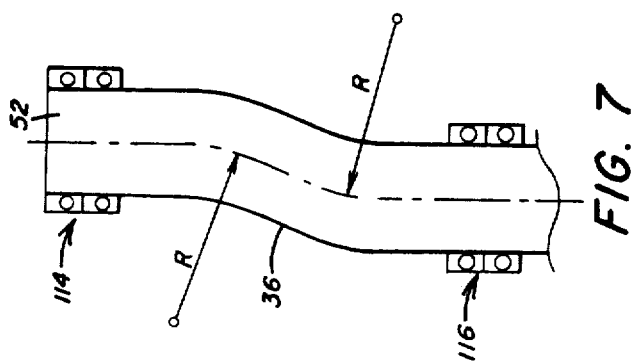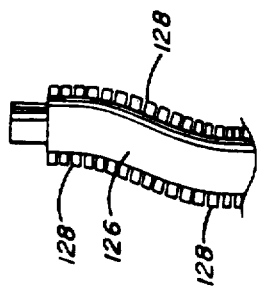

BELLOWS SEALED STEM FOR ROTARY VALVE

CROSS REFERENCE TO THE RELATED APPLICATIONS

This application is a continuation of copending prior application Ser. No. 357,050, filed Mar. 11, 1982, entitled "Bellows Sealed Stem For Rotary Valve" by James. R. Owoc et al., U.S. Pat. No. 4,462,422, issued July 31, 1984.

BACKGROUND OF THE INVENTION

1. Field of the Invention

This invention relates to a valve and more particularly to a rotary valve having a bent valve stem enclosed and hermetically sealed by a bent bellows which is internally pressurized during operation of the valve and supported substantially along its entire length by the valve stem to resist lateral deflection and distortion of the bellows and thereby prevent failure of the bellows seal.

2. Description of the Prior Art

In rotary valves, such as butterfly, ball, plug and the like, for conveyance of fluids and particularly contaminated fluids at high pressure, as well as at substantially reduced pressure or under vacuum conditions, it is preferred to utilize static seals as opposed to packed or dynamic seals. Packed or dynamic seals are subject to wear resulting in valve leakage, particularly at the pressure boundary between the valve stem and the valve member. A commonly used static seal is a bellows surrounding the valve stem. U.S. Pat. Nos. 1,644,825; 2,659,569; 2,659,570 and 3,811,651 disclose rotary valves that utilize a bellows for sealing around the valve stem between the valve actuator and the valve member.

Conventionally, a bellows, when used to seal a valve stem, is bonded or welded to the structure of the valve body that supports the rotatable valve member at one end and at the opposite end to a retainer or cap that connects the valve stem to the valve actuator. This arrangement is illustrated in U.S. Pat. No. 3,811,651. Because the connections at the ends of the bellows are metal-to-metal, a static seal is formed. It is known to laterally deflect the valve stem or utilize a crank-like valve stem and hermetically seal the stem in the bellows. In this manner, the valve stem connects the actuator to the valve member to prevent torsional loading of the bellows, as illustrated in U.S. Pat. Nos. 1,644,825 and 3,811,651.

One of the difficulties encountered with a bent valve stem hermetically sealed in a bellows of the type described above is that the bellows must also bend in order to enclose the valve. Thus, the bellows is initially flexed and therefore is subject to lateral distortion or "squirming". A bellows by its flexible nature when subjected to axial compression tends to deflect laterally or "squirm". This will occur at relatively low forces.

When a bellows is internally pressurized, the pressure applied to the inside of the bellows around the valve stem tends to outwardly deflect the bellows. Therefore, a bellows is subject to failure to a much greater degree when subjected to internal pressure and laterally deflected. This problem is magnified when the bellows is initially flexed or heat.

While it has been suggested by the prior art devices to use a bellows to hermetically seal a valve stem particularly as a static seal around a bent valve stem, a bent bellows in unstable and therefore subject to distortion and consequent bellows failure. Therefore, there is a need in non-rising rotary valves for a bent bellows valve seal which is supported to resist lateral deflection when the bellows is internally pressurized and prevent bellows failure.

SUMMARY OF THE INVENTION

In accordance with the present invention, there is provided a valve that includes a valve body and a passageway extending through the valve body for the flow of fluid therethrough. A valve member is positioned in the passageway for movement between an open position and a closed position to open and close the passageway. Actuating means rotatable about an axis moves the valve member between the open and the closed positions. A valve stem extends between the valve member and the actuating means. The valve stem has a lower end portion connected to the valve member and an upper end portion connected to the actuating means for transmission of rotation of the actuating means to the valve member. The valve stem upper end portion is displaced from the valve stem lower end portion to provide the valve stem with a bent configuration. A bellows surrounds the valve stem to provide a hermetic seal around the valve stem between the valve body and the actuating means. The bellows has a bent configuration corresponding to the bent configuration of the valve stem. The valve stem has an outer surface and the bellows has an inner surface positioned closely adjacent to the valve stem outer surface such that the valve stem supports the bellows against the lateral deflection when subjected to pressure forces to prevent distortion of the bellows.

The bellows is initially flexed around the valve stem. A close tolerance is provided between the valve stem and the bellows so that the bellows is substantially supported along its flexed length by the valve stem. The valve stem thus restains uncontrolled buckling or "squirm" of the bellows and the bellows can withstand higher pressures. By increasing the surface contact between the bellows and the valve stem localized distortion or buckling of the bellows at concentrated points is eliminated.

In one embodiment, the valve stem includes a low friction outer surface or stem coating for preventing wear of the bellows by contact with the valve stem. In one embodiment suitable bearing means surrounding the valve stem supports the bellows on the valve stem. The bearing means permits relative movement between the bellows and the valve stem but eliminates frictional engagement of the bellows with the valve stem.

In another embodiment, the valve stem is provided with a wear resistant sleeve fabricated of a suitable material for reducing the friction generated by rubbing of the bellows on the valve stem. The sleeve may be unitary or a stacked arrangement of individual rings secured to the valve stem and dimensioned to contact the inner surface of the bellows. Preferably, the sleeve is fabricated of a material which provides a bellows wear resistant surface that can be either softer and harder than the bellows material.

Further in accordance with the present invention the inner surface of the bellows is reinforced by plating, particularly at the radii of the convolutions where the wear is the greatest. A selected wear resistant material is bonded or secured to the inner surface of the bellows and projects inwardly of the radii of the convolutes.

Wear of the inner surface of the bellows is also reduced by the provision of flats extending between the convolutes on the inner surface of the bellows. The flats extend parallel to the surface of the valve stem and thus serve to distribute contact of the bellows with the valve stem over a greater surface area of the bellows. This eliminates localized stress points on the bellows and reduces resultant abrasion of the bellows.

Accordingly, the principal object of the present invention is to provide a rotary valve having a bent valve stem enclosed by a bent bellows which is supported substantially along its entire flexed length by the valve stem to resist lateral deflection and distortion of the bellows and thereby prevent failure of the seal provided by the bellows around the valve stem.

A further object of the present invention is to provide in a rotary valve a bent valve stem hermetically sealed by a bent bellows which is supported by the valve stem against buckling when the bellows is internally pressurized.

Another object of the present invention is to provide a bellows sealed valve stem for a rotary valve in which abrasive wear of the bellows by frictional contact with the valve stem is reduced.

A further object of the present invention is to provide a bellows failure indicator for a valve having a valve stem hermetically sealed by a bellows where failure of the bellows seal is detected and the fluid and line pressure are contained in the event of bellows failure.

These and other objects of the present invention will be more completely disclosed and described in the following specification, the accompanying drawings and the appended claims.

BRIEF DESCRIPTION OF THE DRAWINGS

FIG. 1A is an enlarged fragmentary sectional view of a connection of the valve stem to the valve member, illustrating a dynamic seal around the valve stem.

FIG. 6 is a fragmentary schematic view of the bellows surrounding the valve stem, illustrating a further embodiment of plating on the inner surface of the bellows.

FIGS. 7-10 are fragmentary schematic illustrations of various embodiments for reducing frictional wear of the bellows by contact with the valve stem.

FIG. 11 is a fragmentary sectional illustration of a bellows failure indicator adaptable for use with the present invention.

DESCRIPTION OF THE PREFERRED EMBODIMENTS

Figure 1:
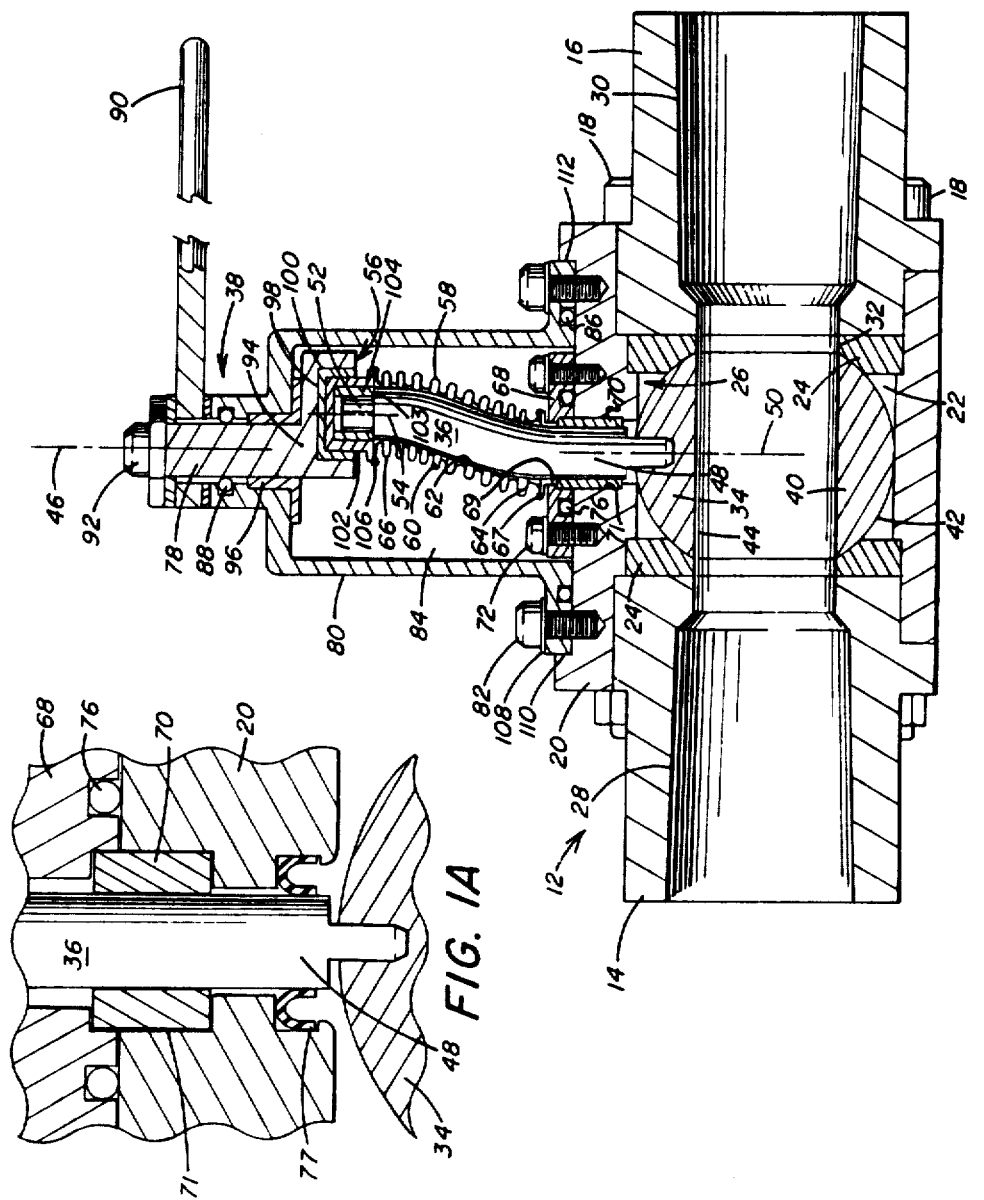
FIG. 1 is a sectional view in side elevation of a ball valve, illustrating a bent valve stem hermetically sealed by a bellows rotatably supported by the crank arm of valve actuator.
Figure 2:
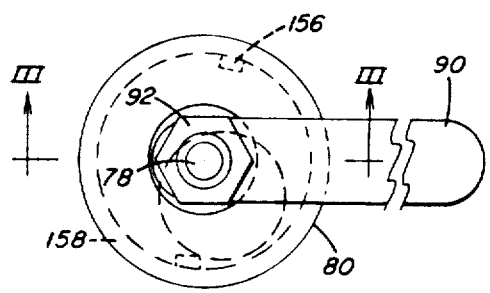
FIG. 2 is a top plan view of the valve actuator, illustrating the crank arm.

Referring to the drawings and particularly to FIGS. 1 and 2, there is illustrated a valve assembly generally designated by the numeral 10 of the ball type for controlling the flow of fluid, either a liquid or a gas, through a piping system. The valve assembly 10 includes a valve body generally designated by the numeral 12 having a pair of conduit portions 14 and 16 connected by bolts 18 to a central body portion 20. The conduit portions 14 and 16 are received within a cavity 22 of the central body portion. Positioned within the cavity 22 and abutting the adjacent ends of the conduit portions 14 and 16 are valve seats 24. The valve seats 24 are rigidly positioned in the cavity 22 by the central body portion 20 and the conduits 14 and 16, thereby forming a valve chamber generally designated by the numeral 26. Valve chamber 26 communicates with passageways 28 and 30 that extend through the conduit portions 14 and 16 respectively. The passageways 28 and 30 are aligned with the passageway 32 that extends through the valve seats 24. The conduit portions 14 and 16 are adaptable for connection to service conduits by any suitable means, such as threading the service conduit into the end portions 14 and 16. In this manner, a continuous passageway is provided through the valve assembly 10.

A rotatably mounted valve member 34 is connected to a valve stem 36 that is rotated by a valve actuator generally designated by the numeral 38. The valve member 34 illustrated in FIG. 1 is characteristic of the valve member utilized in ball-type valves but it should be understood in accordance with the present invention that other suitable rotary-type valve members may be utilized such as a butterfly, plug and the like. The valve member 34 includes a body portion 40 having an arcuate surface 42. The arcuate surface 42 remains in contact with the valve seat 24 as the body portion 40 is rotated in the valve chamber 26. The body portion 40 has a through bore 44 movable into and out of alignment with the passageways 28 and 30 of conduits 14 and 16 and passageway 32 of valve seats 24 to permit the flow of fluid through the conduit portions 14 and 16 and central body portion 20. Rotation of the valve stem 36 through 90° moves the valve member 34 between the open and closed positions.

Movement of the valve member 34 between the open position, as illustrated in FIG. 1 and the closed position (not shown) is controlled by orbital movement of the valve actuator 38 about an axis 46 which is coaxially aligned with a lower end portion 48 of the valve stem 36. The valve stem lower end portion 48 is nonrotatably connected to the valve member 34. The valve stem lower end portion 48 and the valve member 34 are rotatable about an axis 50. As seen in FIG. 1, axis 50 is coaxially aligned with the actuator axis 46. The valve stem 36 also includes an upper end portion 52 connected to the valve actuator 38. The valve stem upper end portion 52 has an axis 54 which is laterally displaced from both axes 46 and 50. Further as illustrated in FIG. 1, the axis 54 in parallel to the axes 46 and 50. With this arrangement, the axis 54 is eccentric to the axes 46 and 50. The valve stem upper end portion 52 is connected to the actuator 38 so that torque is transmitted from the actuator 38 to the valve stem 36 and the valve member 34.

The valve stem 36 is a unitary member between the end portions 48 and 52 and has a preselected curvature which is a double or reversed curvature. The valve stem upper end portion 52 is rotatably connected to the actuator 38 by a bearing assembly generally designated by the numeral 56. A bellows 58 surrounds the valve stem 36 between the upper and lower end portions 48 and 52. The bellows 58 has a generally cylindrical body portion 60 unitary in length and comprising a circumferentially corrugated, axially extending, relatively thin cylindrical wall. Normally the bellows is not bent and upon installation, bends to follow the shape of the valve stem. Preferably, the bellows 58 is metallic, impermeable, and sufficiently flexible to withstand the bending that occurs in operation. The bellows 58 has a passageway 62 extending between a lower open end portion 64 and an upper open end portion 66. Preferably the bellows 58 has an inner diameter positioned closely adjacent the outer diameter of the valve stem 36. In one example, the bellows inner diameter is removed from the outer diameter of the valve stem by a distance equal to 10% of the valve stem diameter. With this arrangement, the valve stem 36 contacts and supports the bellows 58 to prevent lateral distortion or "squirming" of the bellows 58 when subjected to internal and external fluid pressure. The reverse curvature of the valve stem 36 results in contact of the bellows 58 with the valve stem 36 and curvature of the bellows 58 conforming to the curvature of the valve stem 36.

The bellows upper end portion 66 is connected to the actuator 38 to permit relative rotation between the actuator 38 and the bellows upper end portion 66 for transmission of torque from the actuator 38 through the bellows 58 to the valve stem 36. The bellows upper end portion 66 is axially aligned with the valve stem upper end portion 52 and is part of a primary pressure boundary around the valve stem upper end portion 52. The bellows lower end portion 64 is axially aligned with the valve stem lower end portion 48 on the axis 50.

The bellows upper end portion 66 is connected in a manner to be explained later in greater detail to the actuator 38 to form a primary pressure boundary around the valve stem upper end portion 42. The bellows lower end portion 66 is connected by a weld 67 to a bellows plate 68 to form a primary pressure boundary around the valve stem lower end portion 48. The bellows plate 68 is suitably sealingly connected to the valve central body portion 20 to provide a seal around the stem lower end portion 48 at the point where the stem 36 extends from the central body portion 20.

The bellows plate 68 includes a bore 69 through which the valve stem 36 extends. The bore 69 is aligned with a bore 71 through the valve central body portion 20 that receives the valve stem lower end portion 48. Positioned within the central body portion 20 and the bellows plate 68 is a suitable journal-type bearing 70 or bushing. The bearing 70 rotatably supports the valve stem lower end portion 48 within the valve central body portion 20 and the bellows plate 68.

Figure 4:
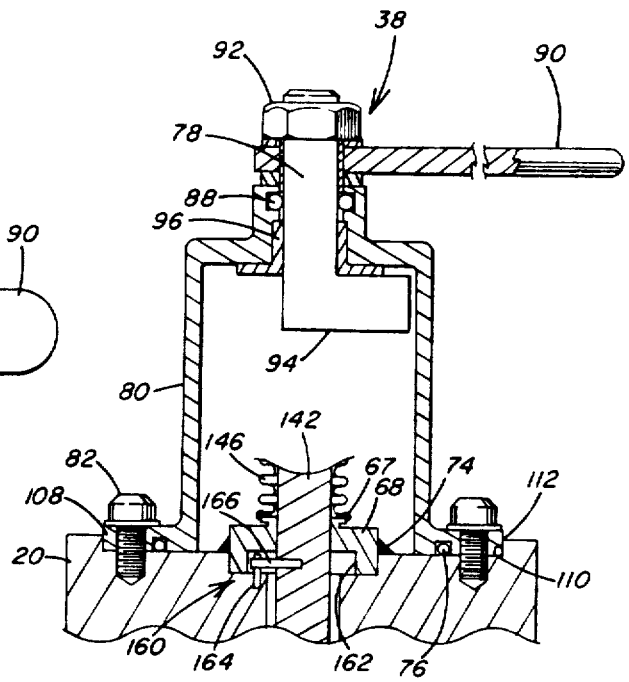
FIG. 4 is a view similar to FIG. 3, illustrating another embodiment of a stop mechanism for the valve stem.
Figure 3:
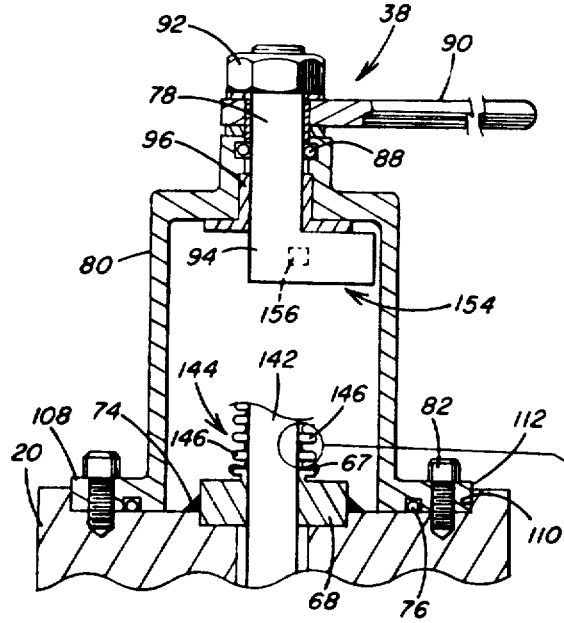
FIG. 3 is a fragmentary view in side elevation, taken along the line III—III of FIG. 2, illustrating a welded connection of the bellows to the valve body to form a hermetically sealed pressure boundary around the lower end of the valve stem, the details of the connection of the stem to the actuator being omitted.

The bellows plate 68 is suitably connected to the valve central body portion 20. As illustrated in FIG. 1, the bellows plate 68 is connected by bolts 72 to the central body portion 20. FIGS. 3 and 4 illustrate an alternate embodiment of the connection of the bellows plate 68 to the central body portion 20. In FIGS. 3 and 4, the plate 68 is shown connected by a circumferential weld at 74 on the upper surface of the valve central body portion 20 around the bellows plate 68. This arrangement forms a welded hermetic seal at the valve stem lower end portion 48 for the 90° operation of the valve member 34. A static O-ring seal 76, shown in FIG. 1, is positioned between the bellows plate 68 and the valve central body portion 20 to provide a seal therebetween and around the valve stem lower end portion 48.

In a further embodiment illustrated in FIG. 1A a dynamic O-ring seal 77 is positioned in a recess of the valve central body portion 20 in surrounding and sealing engagement with the valve stem lower end portion 48. The O-ring seal 77 has an inverted U-shape which permits it to expand outwardly into increased sealing engagement with the valve stem lower end portion 48 in the event of fluid leakage between the valve seats 24 and the valve member 34. This one way seal prevents flow of fluid upwardly around the valve stem 36, but allows pressure to escape from the bellows 58 to the cavity 22. The seal 77 is operable to minimize the pressure in the bellows to provide a safety margin for the bellows cycle life. The seal 77 further promotes bellows cycle life by minimizing the bellows/stem exposure to potentially abrasive or deleterious fluids in the valve. The one way entrance of the seal 77 prevents high pressure from being trapped inside the bellows if the pressure in the valve decreases.

As illustrated in FIG. 1, the actuator 38 includes a crank arm 78 rotatable about the axis 46. The crank arm 78 is rotatably supported within an actuator housing 80 that is connected by bolts 82 in surrounding relation with the bellows plate 68 to the upper surface of the valve central body portion 20. The housing 80 forms a chamber 84 surrounding the valve stem 36 and the bellows 58 and serves as a secondary pressure boundary around the valve stem 36 to back-up the primary pressure boundary formed by the bellows 58 around the stem 36. With this arrangement, in the event of any leakage around the valve stem 36 and through the bellows 58, the housing 80 will contain the leakage and line pressure within the chamber 84.

A static seal is provided by an O-ring 86 between the flanged lower end portion of the housing 80 and the upper surface of the valve central body portion 20. Further, a dynamic seal is provided around the crank arm 78 by an O-ring 88 retained within a recess of the reduced upper end portion of the housing 80. The O-ring 88 sealingly engages the outer surface of the crank arm 78.

Rotation is transmitted to the crank arm 78 by a handle 90 that is nonrotatably connected to crank arm 78 by a nut and bolt combination 92. Thus, turning the handle 90 through a preselected degree of rotation rotates the crank arm 78 about the rotational axis 46 to orbit the valve stem upper end portion 52 about the axis 46 and thereby rotate the valve stem lower end portion 48 about the axis 50 to, in turn, rotate the valve member 34 between the open and closed positions. The crank arm 78 includes an enlarged lower end portion 94 offset from the axis 46. The end portion 94 is rotatably supported within the housing 80 by a bushing-type thrust bearing 96 operable to carry axial and radial thrust loads and rotatably support the crank arm enlarged end portion 94. The thrust bearing 96 is also operable to resist axial movement of the enlarged lower end portion 94 as the pressure increases within the bellows 58. The enlarged end portion 94 includes a recess 98 in which the axis of the recess 98 is aligned with the axis 54 of the stem upper end portion 52. The recess 98 is offset from the rotational axis 46 of the crank arm 79 so that the axis of the recess 98 is aligned with the axis 54 and is eccentrically positioned relative to the actuator axis 46.

The bearing assembly 56 is positioned within the recess 98. The bearing assembly 56 includes a handle bearing portion 100 which is preferably a bushing type journal bearing operable to carry both radial and thrust loads. The handle bearing 100 is retained within the recess 98 and, in turn, receives a cup-shaped bellows cap 102. The handle bearing 100 supports the bellows gap 102 for rotation relative to the crank arm 78. The bellows cap 102, in turn, receives a stem bearing 104 which is preferably a bushing-type journal bearing operable to carry radial loads. The stem bearing 104 is positioned in surrounding relation with the valve stem upper end portion 52 and permits the bellows cap 102 to rotate relative to the valve stem upper end portion 52. The stem bearing 104 is positioned on a stem shoulder 103 to position the bearing 104 on the stem upper end portion 52 for axial movement of the bellows cap 102 in response to upward axial forces exerted on the valve stem 36.

The bellows cap 102 is closed at one end portion to surround and seal the valve stem upper end portion 52 within the recessed end portion 94 of the crank arm 78. The bellows cap 102 includes a flanged open end portion positioned opposite the bellows upper end portion 66. The bellows upper end portion 66 is welded at 106 to the flanged end of the bellows cap 102. This arrangement permits relative rotation between the crank arm 78 and the bellows cap 102 welded to the bellows upper end portion 66. Further, relative rotation is permitted between the bellows cap 102 and the valve stem upper end portion 52. By the combination of the thrust and radial bearings 100 and 104 torque is transmitted from the crank arm 78 to the valve stem 36 as the valve stem upper end portion 52 orbits or turns the stationary rotational vertical axis 46 of the crank arm 78.

The welded connection of the bellows upper end portion 66 to the flanged end of the bellows cap 102 around the valve stem upper end portion 52 hermetically seals the valve stem upper end portion 52 within the housing 80. The welded connection provided at 106 between the bellows 58 and the bellows cap 102 forms a valve primary pressure boundary to prevent the escape of line fluid and pressure around the valve stem 36. A secondary pressure boundary is formed by the O-ring 88 sealingly positioned between the housing 80 and crank arm 78. Thus, the crank arm 78 and housing 80 not only function as a means for actuating the valve 10 but also are operable in combination with O-ring 88 as a dynamic seal to back up the primary pressure boundary provided by the bent bellows 58.

The housing 80 is operable in the event of bellows failure or any leak across the primary pressure boundary to contain the fluid and full line pressure within the chamber 84. This arrangement permits high pressures and hazardous and contaminated fluids to be contained within the valve assembly 10 and prevents their escape to the environment in the event of a primary pressure boundary failure. One advantage of the parallel offset between the axes 46 and 54 is a reduced clearance around axis 46 of the crank arm 78. This permits the inside diameter of the housing 80 and, therefore, the size of the chamber 84 to be substantially reduced while at the same time serve as a back-up pressure boundary. Reducing the inside diameter of housing 80 permits the wall thickness of housing 80 to be reduced without a decrease in the capability of the housing 80 to withstand internal pressure. This provides lighter, and less expensive secondary pressure boundary than otherwise permitted.

The housing 80 maintains the rotational axis of the crank arm 78 aligned with the axis 46 which is, in turn, aligned with the axis 50. Rotation of the crank arm 78 about the rotational axis 46 is maintained by the position of a flanged lower end portion 108 of the housing 80 within a recess 110 of the valve central body portion 20. The flanged end portion 108 is guided into position on the valve central body portion 20 by engagement with the recess 110. Surfaces 112 of the housing end portion 108 abut the wall of recess 110. In this manner, the housing 80 is precisely located on the central body portion 20 so that the axis of rotation of the crank arm 78 is maintained in alignment with the axes 46 and 50. The bellows plate 68 is similarly aligned with axes 46 and 50 by a radially abutting relationship with bearing 70. The bearing 70 is aligned by a radially abutting relationship with bore 71 which is coaxially aligned with axes 46 and 50.

To operate the valve assembly 10 and move the valve member 34 between the open and closed positions within the valve chamber 26, torque is applied to the handle 90 to rotate the crank arm 78 about the axis 46 to, in turn, orbit the enlarged lower end portion 94 and the valve stem upper end portion 52 about the axis 46. This initiates turning of the valve stem lower end portion 48 about the axis 50 and rotation of the valve member 34 about the axis 50. The bellows cap 102 also orbits with the valve stem upper end portion 52 about the axis 46. Rotation of the crank arm 78 is transmitted through the handle bearing 100, the bellows cap 102, and the stem bearing 104 to the stem upper end portion 52. Thus, rotation is transmitted by a force eccentrically applied to the stem upper end portion 52. The valve actuating force is transmitted by torque applied outside the primary and secondary pressure boundaries through the bent bellows 58 to the valve member 34.

While the bellows cap 102 orbits around axis 46, it does not rotate about axis 54. The primary pressure boundary elements including the bellows 58 and bellows cap 102 are fixed from rotating relative to axes 46 and 50; however, the bellows 58 flexes permitting the bellows cap 102 to orbit in an arc around the axis 46. The end portion 94 and valve stem upper end portion rotate about axes 46 and 50. The bearings 100 and 104 support the bellows cap 102 for rotation relative to the end portion 94 and the stem upper end portion 52.

Further in accordance with the present invention, the thrust bearing 96, handle bearing 100, and the stem bearing 104 are provided with sufficient length and structural strength to prevent binding of the rotational connection of the valve stem upper end portion 52 to the actuator 38. Thus, the various connecting parts therebetween are not laterally displaced from the offset and parallel alignment as above described. This maintains the actuator axis 46 in spaced parallel relation to the valve stem upper end portion axis 54.

In operation of the valve assembly 10 with the pressure in cavity 22 greater than the pressure externally of housing 80, the bellows 58 is internally pressurized and consequently upward thrust forces are exerted within the bellows upon the bearing assembly 56. However, it should be understood that the present invention is also operable in low pressure and vacuum conditions. The combination of the bearings 96, 100 and 104 resist the radial and thrust forces applied from the pressure within the bellows 58 to maintain relative rotation between the crank arm 78 and the valve stem upper end portion 52. This arrangement of maintaining the axes 46 and 54 parallel also permits axial movement of the valve stem upper end portion 52 during operation of the valve 10. Also this arrangement does not exert a biasing force on the bellows 58, thus there is no "springback" effect on the bellows 58.

By maintaining the rotational axes 46 and 54 in spaced parallel relation, a relatively conventional rotatable actuator, such as the handle 90 connected to the crank arm 78, is utilized with the present invention. The torque applied to the handle 90 is transmitted by the crank arm 78 to the offset crank arm end portion 94 thereby transmitting a force to the valve stem upper end portion 52 which is offset from the rotational force transmitted to the crank arm 78. In addition, by providing both the valve stem 36 and the bellows 58 with a double or reverse curvature, as illustrated in FIG. 1, the parts connecting the valve stem upper end portion 52 to the actuator 38 are free of inclined or angled surfaces. By maintaining these connections at either right angles or in spaced parallel relation, axial movement between the valve stem 36 and the valve actuator 38 is taken up by the bearing assembly 56. The bearing assembly 56 maintains any displacement that occurs in an axial direction. This eliminates any lateral forces acting on the valve stem upper end portion 52 which would otherwise tend to bind or cock the connection of the valve stem upper end portion 52 to the crank arm 78 during rotation. In addition, fabrication of these surfaces is less costly because only conventional parallel and perpendicular surfaces are required.

In operation, the bellows 58 is internally pressurized by the pressure inside cavity 22. As a result, an accordion, expansion effect takes place on the bellows and the bellows 58 is urged to expand axially. However, with the end portions of the bellows 58 axially fixed, the axial forces acting on the bellows 58 are transmitted from the bellows upper end portion 66 to the bellows cap 102. The bellows cap 102 is urged upwardly in a direction parallel to the axis 46. This upward axial force applied to the bellows cap 102 is taken up by the combination of radial and thrust bearings, 96, 100 and 104 which provide for limited axial displacement of the connected parts. Thus, by maintaining the rotational axes 46 and 54 in spaced parallel relation, any axial forces applied to the valve stem 36 and bellows 58 are taken up by the bearing assembly 56. The pressure forces are maintained in an axial direction. The valve stem upper end portion 52 remains rotatable relative to the crank arm 78. Forces acting in a radial direction are restrained to prevent binding of the relatively rotating parts.

Internally pressurizing the bellows 58 exerts upward and lateral forces upon the bellows, generating rubbing or frictional engagement of the inner surface of the bellows 58 with the outer surface of the valve stem 36. In view of the fact that the valve stem 36 rotates within the bellows 58 and contacts the inner surface of the bellows 58, the bellows 58 conforms to the configuration of the valve stem 36. The bellows tends to be naturally unstable and, therefore, subject to distortion. The instability of the bellows 58 is further compounded by the fact that the bellows is internally pressurized. The total effect of bending the bellows and internally pressurizing the bellows is to increase the frictional contact of the bellows with the valve stem. Wear of the bellows can result thereby reducing the cycle life of the bellows and the capability of the bellows to maintain a primary pressure boundary around the valve stem 36.

As pressure is applied to the inside of the bellows 58, the bellows will tend to deflect laterally or "squirm". A deficiency with any bellows, especially an elongated, flexible bellows, is the limited maximum internal pressure which the bellows can sustain. This is not based on the bellows wall strength or rupture pressure but upon the "squirm" pressure which is lower than the bellows rupture pressure. The "squirm" pressure is the pressure at which a straight, unsupported bellows deflects when internally pressurized. This action is comparable to a long slender rod buckling under a compressive load.

To enhance the stability of the initially flexed bellows 58, a reduced clearance is provided between the valve stem 36 and the bellows 58 to the extent that the bellows 58 is supported substantially along its flexed length by the valve stem 36. In this manner, the valve stem 36 restrains uncontrolled buckling or "squirm" of the bellows 58. Preferably the clearance between the outer surface of the valve stem 36 and the inner surface of the bellows 58 distributes the surface contact between the bellows and the valve stem over substantially the entire length of the bellows.

By providing a maximized gradual curvature to the valve stem 36, as illustrated in FIG. 7 and thus to the bellows 58, the amount of flexing of each bellows convolute is minimized. In the bent portion of the bellows 58, each convolute is tilted or flexed toward either axis 46 or axis 54. As the bellows orbits around axis 54, each convolute maintains the same magnitude of flex but the orientation of flexing rotates to correspond to the rotation of axis 54. The cyclic flexing of each convolute generates fatigue leading to bellows failure. The internal pressure will additionally influence the flexing cycle life. With the arrangement shown in FIG. 7, however, the stem 36 and bellows 58 are formed with a uniform curvature having a radius R in each bent portion, as diagrammatically illustrated in FIG. 7. Each bent portion has the same radius of curvature, R. Preferably, the two bent portions are uninterrupted so that the reverse curvature has no intermediate straight section. With this arrangement, the maximum radius of bellows curvature is used to obtain a preselected offset of axes 50 and 54. Thus, by maximizing the radius R of bellows curvature, the flex of each bellows convolute is minimized to increase the cycle life of the bellows 58. The bellows can withstand higher pressures and increased torque can be applied to the valve actuator 38 in the valve assembly 10 having a compact configuration.

By increasing the area of contact between the valve stem 36 and the bellows 58, the overall stability of the bellows 58 is increased and localized distortion or buckling of the bellows at concentrated points is eliminated. With the present invention a substantial number of the convolutions of the bellows 58 are in contact with the valve stem 36, thereby minimizing buckling of the bellows 58 when pressurized. Because of the relative rotary rubbing motion of the bellows and stem, it is desirable to minimize the wear and friction between these two parts. Wear of the bellows is undesirable primarily because the bellows is relatively thin and only a minor amount of wear will diminish the bellows wall thickness to a point resulting in bellows failure. Bellows wear is also accelerated by the friction generated between the stem and bellows when torque is applied to the stem.

To prevent wear of the bellows 58 by contact with the valve stem 36, the stem 36 is provided with a low friction outer surface or stem coating. FIGS. 8-10 illustrate various embodiments of the bent valve stem having a low friction outer surface adaptable for supporting a bellows with a minimum of wear in accordance with the present invention.

As the valve assembly 10 is operated to rotate the valve member 34 the bellows 58 flexes around the valve stem 36 as the stem rotates within the bellows 58. The bellows 58 does not rotate but the stem 36 rotates relative to the bellows 58. Both the valve stem upper end portion 52 and the bellows upper end portion 66 orbit about the axis 46. The valve stem upper end portion 52 rotates relative to the valve central body portion 20 during said orbital movement, but the bellows upper end portion 66 does not rotate during the orbital movement. Subsequently a rubbing motion is generated between the valve stem 36 and the bellows 58.

The friction generated between the valve stem 36 and the bellows 58 can also be reduced by the application of a wear resistant stem coating or stem plating. For example, as illustrated in FIG. 8, a wear resistant material, such as a plastic material in the form of a sleeve 118 is molded in surrounding relation with the embodiment of a valve stem 120 having a reduced outer diameter and enlarged shoulder end portions 122 and 124 for receiving the sleeve 118. Preferably the sleeve 118 is molded or bonded to the outer surface of the valve stem 120. Most preferably the sleeve 118 is fabricated of a material which is deformable or resilient in order to reduce the friction between the bellows and the sleeve 118.

A further embodiment of a wear resistant surface around the valve stem is illustrated in FIG. 9 in which a valve stem 126 is surrounded by a plurality of resilient rings 128 fabricated of a suitable deformable material, such as plastic. In one embodiment the rings 128 are split and in another embodiment the rings 128 are unitary. The rings 128 are arranged in a stacked relation on the stem 126. The bellows (not shown) engages the rings 128 which serve to reduce the friction generated between the stem 126 and the bellows.

FIG. 10 illustrates another embodiment of a valve stem 130 having a wear resistant plating 132 deposited thereon for supporting the bellows with a minimum of wear of the valve stem 130. In this manner, the plating 132 provides a build-up of metal on the valve stem 130 which conforms to the bent configuration of the valve stem. Further, the plating 132 may be fabricated of a material that is softer than the material of the bellows so that the plate 132 wears and not the bellows around the plate 132. The plating 132 in another embodiment is a material harder than the material of the bellows so that frictional forces and wear of the bellows 58 and plating 132 is reduced.

Another approach to preventing wear of the bellows by frictional engagement with the valve stem is to plate the inner surface of the bellows. FIG. 6 illustrates a bellows 134 positioned in surrounding relation with a valve stem 136. The bellows 134 includes an inner surface which is built up by the addition of plating 138 formed integral with the bellows 134. The plating 138 may be fabricated of either a material softer than the material of the valve stem 136 or harder than the material of the valve stem 136.

As is well known, a bellows is formed of a plurality of convolutions 140. Because of the nature of plating irregular surfaces, specifically the inner surface of the bellows convolutions 140, an increased material thickness is formed on the sharply curved inner surfaces where wear of the convolutions 140 is the most severe. Thus, by plating the inner surface of the bellows, a maximum plating thickness is provided where the wear is the greatest, i.e. at the convolutions where the bellows rubs against the valve stem.

Figure 5:
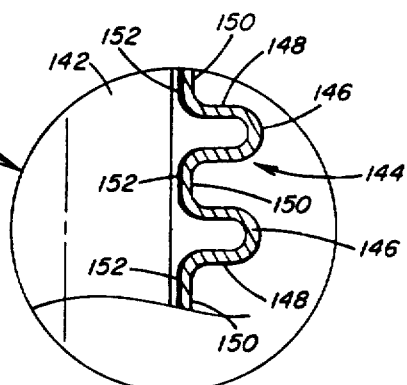
FIG. 5 is an enlarged fragmentary sectional view of the valve stem and surrounding bellows, illustrating plating on the inner surface of the bellows to reduce bellows wear.

In accordance with the present invention, the convoluted structure of the bellows may be designed to reduce the wear of the bellows due to frictional engagement with the valve stem. Referring to FIG. 5, there is illustrated a valve stem 142 surrounded by a bellows generally designated by the numeral 144. The bellows 144 is fabricated by a preselected material such as metal, and includes a plurality of convolutions 146 having a preselected radii. Each convolution 146 includes horizontally extending surfaces 148 formed integral with vertically extending sections 150 to thereby connect adjacent convolutions. The vertically extending sections or flats 150 between the convolutions 146 have an inner surface positioned opposite the outer surface of the valve stem.

A suitable wear resistant material 152 as illustrated in FIG. 5 may be bonded or secured to the inner surfaces of the vertically extending sections 150. In this manner, the arcuately shaped convolutions 146 are moved from contact with the valve stem and the sections 150 that extend in an axial direction parallel to the axis of the valve stem are the only sections of the bellows 134 engageable with the valve stem. The parallel alignment of the sections 150 with the axis of the valve stem 142 minimizes wear of the bellows by distributing frictional engagement of the valve stem 142 with the bellows 144 over a greater surface area of the bellows, i.e. over the wear resistant sections 150.

FIG. 7 illustrates bearing support of the valve stem 36 by a plurality of ball bearings generally designated by the numerals 114 and 116 positioned in surrounding relation with the valve stem end portions 48 and 52. The bellows (not shown in FIG. 7) is positioned in surrounding relation on the stem 36. The ball bearings 114 and 116 can be used in lieu of bearings 70 and 104 illustrated in FIG. 1. In a similar manner, thrust or radial ball bearings can be used in lieu of bearings 96 and 100 in FIG. 1. The ball bearings 114 an 116 function as rotational wear resistant devices operable to reduce friction. As further illustrated in FIG. 7, the valve stem upper end portion 52 does not require a stem shoulder to maintain the ball bearings 114 in place.

Now referring to FIGS. 2 and 3, there is illustrated a first embodiment of apparatus for limiting rotation of the valve actuator 30 to move the valve member 34 between the open and closed positions in the valve chamber 26. FIGS. 2 and 3 schematically illustrate the crank arm 78 with the details of the connection of the valve stem 36 and the bellows 58 to the crank arm 78 omitted to more clearly illustrate a valve stop mechanism generally designated by the numeral 154. Only the lower portion of the valve stem is shown in FIG. 3. In the embodiment shown in FIGS. 2 and 3, the valve stop mechanism 154 is operable to limit rotation of the actuator 38 and the valve stem 36 to 90° rotation between the open and closed positions.

As described above, the crank arm 78 includes the enlarged end portion 94 which is eccentrically positioned relative to the rotational axis 46 of the crank arm 78. Thus, the enlarged end portion 94 has a peripheral surface positioned closely adjacent to the inner surface of the stem housing 80. The stop mechanism 154 includes a pair of protuberances 156 that are secured to and extend inwardly from the wall of the housing 80. The protuberances 156 are positioned at an elevation on the housing 80 so that they project inwardly and oppositely of the periphery of the enlarged end portion 94. When the handle 90 is turned, the enlarged end portion 94 contacts the protuberances 156 obstructing further rotation of the crank arm 78 and the valve stem 36.

Preferably, the protuberances 156 are spaced on the housing 80 to permit unobstructed rotation of the crank arm 78 through a 90° angle. When the handle is rotated to the extent that the enlarged end portion 94 is moved into abutting relation with the protuberance 158 the valve assembly 10 is in the open position. Accordingly, rotation of the handle 90 in the opposite direction moves the enlarged end portion 94 out of contact with the protuberance 158 and toward and eventually into contact with the protuberance 156. Rotation of the handle 90 in this direction moves the valve member 34 from the open position illustrated in FIG. 1 to a closed position where the valve member 34 blocks flow through the valve chamber 26.

In order to insure that the through bore 44 of the valve body 40 is aligned with the passageways 28 and 30 to open the valve 10, the protuberance 156 must be located at the selected point on the interior wall of the housing 80 where contact of the protuberance with the enlarged end portion 94 corresponds to the position where the bore 44 is aligned with the passageways 28 and 30. Also, the protuberance 158 must be positioned at the point on the interior wall of the housing 80 where when contacted by the enlarged end portion 94, the solid faces of the valve member 34 have been moved into a position within the chamber 26 obstructing flow between the passageways 28 and 30. In this manner, the valve member 34 is limited to rotation through 90° where the end points of rotation of the valve member 34 correspond to the open and closed positions of the valve.

Now referring to FIG. 4, there is illustrated another embodiment of a valve stop mechanism generally designated by the numeral 160 for limiting rotation of the valve stem 36 to, in turn, control rotation of the valve member 34 and assure that the valve member is positively moved between the open and closed positions. The valve stop mechanism 160 illustrated in FIG. 4 includes an annular recess 162 formed in the bellows plate 68 in surrounding relation with the valve stem lower end portion 142. The bellows plate 68 is sealingly engaged to the valve central body portion 20 by the circumferential weld 74 that extends completely around the periphery of the bellows plate 68 or any other suitable static seals. To limit the valve stem 36 to 90° rotation, a pair of stop pins 164 (only one of which is illustrated in FIG. 4) extends upwardly from the valve central body portion 20 into the annular recess 162. Secured to and extending outwardly from the valve stem lower end portion 142 is a pin 166. The pin 166 has a length which permits the pin 166 to extend outwardly from the stem lower end portion 142 a distance greater than the spacing of the stop pin 164 from the stem 36.

The stop pins 164 are precisely located on the central body portion 20 within the annular recess 162 so that when the pin 166 is in contact with either stop pin 164 the valve member 34 is either in the open or closed position. The pin 166 engaging the pin 164, as shown in FIG. 4 corresponds to the open position of the valve.

Depending on the design clearances between the several actuator parts, significant "play" may exist between the handle 90 and the valve member 34. This results in greater than 90° rotation of the handle 90, such as 100° rotation, to move the valve member 34 between the open and closed positions. However, the handle 90 is turned until rotation is obstructed by contact with the roll pin 166 with either one of the stop pins 164. Thus, the handle 90 is not limited to precisely 90° rotation and "play" may occur in the handle as the valve member 34 is positively rotated through 90° into and out of the open and closed positions of the valve. The operator may find that between the open and closed positions of the valve, the handle 90 rotates through an angle greater than 90°. However, the end limits of rotation of the valve stem 36 precisely locate the valve member 34 in either the open or closed position.

Now referring to FIG. 11, there is schematically illustrated another embodiment of the stem housing 80 which surrounds the bellows 58 and the valve stem 36. As illustrated in FIGS. 1, 3 and 4, the housing 80 forms the chamber 84 around the bellows 58. The chamber 84 serves as a secondary pressure boundary to back up the primary pressure boundary provided by the bellows 58 around the valve stem 36. In operation, the chamber 84 is not pressurized unless the primary pressure boundary provided by the bellows 58 fails. Therefore, a bellows failure indicator generally designated by the numeral 168 in FIG. 11 is provided on the housing 80 to sense a pressure buildup within the chamber 84. A buildup of pressure within the chamber 84 indicates failure of the bellows 58 to prevent fluid leakage around the valve stem 36. The bellows failure indicator 168 preferably includes a pressure guage, a pressure switch, or any other device operable to indicate that the bellows 58 has failed and fluid is leaking between the bellows 58 and the valve stem 36. The indicator 168 is suitably connected to the housing 80. An opening 170 through the housing permits the indicator 168 to be exposed to the pressure conditions within the chamber 84.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. An actuating device for movement of a member mounted in an enclosure comprising, actuating means rotatable about an axis for moving said member, a stem extending between said member and said actuating means, said stem having an upper end portion, bearing means carried by said actuating means for connecting said actuating means to said stem upper end portion to transmit rotation from said actuating means to said stem, said stem having a lower end portion connected to said member for transmission of rotation from said actuating means to said member, said bearing means being positioned on said actuating means laterally displaced from said actuating means axis, said stem upper end portion having an axis of rotation and said stem lower end portion having an axis of rotation, said stem lower end portion axis being axially aligned with said actuating means axis, said stem upper end portion axis being laterally displaced from said actuating means axis and said stem lower end portion axis to provide said stem with a bent configuration, said stem upper end portion being rotatably received in said bearing means to maintain said stem upper end portion axis in spaced relation to said actuating means axis, a bellows surrounding said stem to provide a hermetic seal around said stem between said enclosure and said actuating means, said bellows having a bent configuration corresponding to the bent configuration of said stem, said stem having an outer surface and said bellows having an inner surface positioned closely adjacent to said stem outer surface such that said stem supports said bellows against lateral deflection when subjected to pressure forces to prevent distortion of said bellows, and wear resistant means positioned between said stem outer surface and said bellows inner surface for reducing the frictional wear between said bellows and said stem.

2. An actuating device as set forth in claim 1 in which, said bellows being positioned in close proximity to said stem to flex in conformity with said bend in said stem, and said wear resistant means includes a solid lubricant coating maintained in contact with said bellows inner surface substantially along the entire flexed length thereof by said stem outer surface.

3. An actuating device as set forth in claim 1 in which, said wear resistant means includes plating positioned on said bellows inner surface to reduce wear of said inner surface upon contact with said stem outer surface.

4. An actuating device as set forth in claim 1 in which, said wear resistant means is positioned on said stem outer surface and in contact with said bellows inner surface for reducing the frictional contact between said stem and said bellows to prevent wear of said bellows.

5. An actuating device as set forth in claim 1 in which, said actuating means includes a lower end portion offset from said actuating means axis, a recess in said actuating means lower end portion, said recess having an axis coaxial with said stem upper end portion axis, said bearing means positioned in said recess and surrounding said stem for supporting said actuating means on said stem to only permit movement of said actuating means relative to said stem in a direction along said stem upper end portion axis without generating abrasion of said stem, and said bearing means restraining said stem upper end portion from moving laterally to prevent binding of said actuating means with said stem.

6. An actuating device as set forth in claim 1 in which, said bellows includes a lower end portion, a bellows plate positioned on said enclosure in surrounding relation with said stem, a first circumferential weld surrounding said bellows plate for sealingly connecting said bellows plate to said enclosure, and a second circumferential weld surrounding said bellows lower end portion for connecting said bellows to said bellows plate to provide a hermetic seal around said stem at said bellows lower end portion.

7. An actuating device as set forth in claim 1 which includes, a housing surrounding said bellows and extending between said actuating means and said enclosure to form a back-up pressure boundary around said stem in addition to the hermetic seal provided by said bellows around said stem, a sealed chamber formed between said housing and said bellows, indicator means associated with said housing for sensing a failure of the hermetic seal and pressure leakage through said bellows around said stem, and said housing being operable to contain the pressure leakage within said chamber.

8. An actuating device for movement of a member mounted in an enclosure comprising, actuating means rotatable about an axis for moving said member, a stem extending between said member and said actuating means, said stem having a lower end portion connected to said member and an upper end portion connected to said actuating means for transmission of rotation from said actuating means to said member, said stem upper end portion being displaced from said stem lower end portion to provide said stem with a bent configuration, a bellows surrounding said stem to provide a hermetic seal around said stem between said enclosure and said actuating means, said bellows having a bent configuration corresponding to the bent configuration of said stem, said stem having an outer surface and said bellows having an inner surface positioned closely adjacent to said stem outer surface such that said stem supports said bellows against lateral deflection when subjected to pressure forces to prevent distortion of said bellows, and coating means positioned on said stem outer surface for reducing the frictional contact between said stem and said bellows to prevent wear of said bellows.

9. An actuating device as set forth in claim 8 in which, said coating means includes a sleeve member surrounding said stem outer surface and secured thereto, and said sleeve supporting said bellows on said stem to reduce abrasion of said bellows inner surface upon contact with said sleeve.

10. An actuating device as set forth in claim 8 in which, said coating means includes a resilient wear resistant material molded onto said stem outer surface, and said resilient wear resistant material supporting said bellows on said stem to reduce abrasion of said bellows inner surface upon contact with said resilient wear resistant material.

11. An actuating device for movement of a member mounted in an enclosure comprising, actuating means rotatable about an axis for moving said member, a stem extending between said member and said actuating means, said stem having a lower end portion connected to said member and an upper end portion connected to said actuating means for transmission of rotation from said actuating means to said member, said stem upper end portion being displaced from said stem lower end portion to provide said stem with a bent configuration, a bellows surrounding said stem to provide a hermetic seal around said stem between said enclosure and said actuating means, said bellows having a bent configuration corresponding to the bent configuration of said stem, said stem having an outer surface and said bellows having an inner surface, and a plurality of ring members positioned on said stem to support said bellows and remove said bellows inner surface from contact with said stem outer surface to reduce frictional wear between said bellows and said stem.

12. An actuating device for movement of a member mounted in an enclosure comprising, actuating means rotatable about an axis for moving said member, a stem extending between said member and said actuating means, said stem having a lower end portion connected to said member and an upper end portion connected to said actuating means for transmission of rotation from said actuating means to said member, said stem upper end portion being displaced from said stem lower end portion to provide said stem with a bent configuration, a bellows surrounding said stem to provide a hermetic seal around said stem between said enclosure and said actuating means, said bellows having a bent configuration corresponding to the bent configuration of said stem, said stem having an outer surface and said bellows having an inner surface positioned closely adjacent to said stem outer surface such that said stem supports said bellows against lateral deflection when subjected to pressure forces to prevent distortion of said bellows, said bellows inner surface includes a plurality of flats connected by a plurality of convolutes, said flats being positioned in substantially spaced, parallel relation with said stem outer surface and said convolutes being removed from contact with said valve stem outer surface, a wear resistant material secured to said flats positioned between said flats and said stem outer surface, and said flats with said wear resistant material being arranged to minimize wear of said bellows by uniformly distributing the frictional engagement of said stem with said bellows over the surfaces of said flats substantially along the entire length of said bellows.

* * * * *